(12) United States Patent
Rancic et al.

(10) Patent No.: US 11,752,562 B2
(45) Date of Patent: Sep. 12, 2023

(54) METHOD FOR IMPROVED DEBURRING OF AN AERONAUTICAL PART

(71) Applicant: SAFRAN AIRCRAFT ENGINES, Paris (FR)

(72) Inventors: Mickael Rancic, Moissy-Cramayel (FR); Jérôme Salmon, Moissy-Cramayel (FR); Pierre Marcel Emilien Navar, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 81 days.

(21) Appl. No.: 17/619,866

(22) PCT Filed: Jun. 16, 2020

(86) PCT No.: PCT/HR2020/051029
§ 371 (c)(1),
(2) Date: Dec. 16, 2021

(87) PCT Pub. No.: WO2020/254753
PCT Pub. Date: Dec. 24, 2020

(65) Prior Publication Data
US 2022/0355404 A1 Nov. 10, 2022

(30) Foreign Application Priority Data

Jun. 19, 2019 (FR) ..................... 19 06604

(51) Int. Cl.
*B23C 3/12* (2006.01)
*B25J 9/16* (2006.01)
*B25J 11/00* (2006.01)

(52) U.S. Cl.
CPC ............ *B23C 3/12* (2013.01); *B23C 2215/04* (2013.01); *Y10T 409/303752* (2015.01); *Y10T 409/304256* (2015.01)

(58) Field of Classification Search
CPC ... B23C 3/12; B23C 2220/16; B23C 2220/20; B23C 2215/56; B23C 2215/04;
(Continued)

(56) References Cited

U.S. PATENT DOCUMENTS 4,590,578 A 5/1986 Barto, Jr. et al.
4,897,586 A * 1/1990 Nakata ................... G05B 19/42
318/568.17

(Continued)

FOREIGN PATENT DOCUMENTS

CN 107962615 A * 4/2018
CN 110202598 A * 9/2019

(Continued)

OTHER PUBLICATIONS

Machine Translation of JP 60-048210 A, which JP '210 was published Mar. 1985.*

(Continued)

*Primary Examiner* — Erica E Cadugan
(74) *Attorney, Agent, or Firm* — Oblon, McClelland, Maier & Neustadt, L.L.P.

(57) ABSTRACT

A method for deburring an aeronautical part with an articulated tooling including a plurality of axes of rotation, the aeronautical part including at least one edge to be deburred, the articulated tooling including a tool holder, holding a calibration tool and a machining tool, the calibration tool and the machining tool being fixed to the tool holder and being immovable relative to one another, the method including steps of calibrating the calibration tool and the machining tool, of parameterizing the aeronautical part, of deburring the at least one edge to be deburred with the machining tool moving along a predetermined trajectory, on the basis of the parameters obtained during the parameterization step.

10 Claims, 9 Drawing Sheets

(58) Field of Classification Search
CPC .............. Y10T 409/304144–304256; Y10T
409/501476–502132; B23D 79/005;
B23D 79/02; B23D 79/04; B23D 79/06;
B25J 11/006; B25J 9/1692; B25J
15/0066; B25J 15/0052–0061; G05B
19/401–19/4015; G05B 19/402; G05B
19/404; G05B 2219/39021; G05B
2219/39024; G05B 2219/39026; G05B
2219/45151
USPC ......... 409/138–140, 297–301; 700/253–254,
700/192–193
See application file for complete search history.

(56) References Cited

U.S. PATENT DOCUMENTS

| | | | | |
|---|---|---|---|---|
| 7,534,077 | B2 * | 5/2009 | Ban | G05B 19/4163 |
| | | | | 700/193 |
| 2003/0037588 | A1 | 2/2003 | Schaefer | |
| 2017/0232618 | A1 * | 8/2017 | Pidan | G05B 19/19 |
| | | | | 700/164 |
| 2017/0282258 | A1 * | 10/2017 | Ohno | B23C 3/12 |
| 2019/0143511 | A1 * | 5/2019 | Kai | B25J 9/1694 |
| | | | | 700/254 |
| 2021/0220960 | A1 * | 7/2021 | Schill | B23C 3/00 |
| 2021/0387344 | A1 * | 12/2021 | Shao | B25J 9/1692 |

FOREIGN PATENT DOCUMENTS

| | | | |
|---|---|---|---|
| EP | 683018 | A1 * | 11/1995 |
| FR | 2620242 | A1 * | 3/1989 |
| FR | 2 875 165 | A1 | 3/2006 |
| JP | 60-048210 | A * | 3/1985 |
| WO | 2006/030084 | A1 | 3/2006 |

OTHER PUBLICATIONS

International Search Report dated Oct. 9, 2020 in PCT/FR2020/051029 filed Jun. 16, 2020, 3 pages.
Preliminary French Search Report dated Mar. 11, 2020 in French Patent Application No. 1906604 filed Jun. 19, 2019, 4 pages (with Translation of Category).
Mailhot, D., "Amélioration De La Précision D'Un Bras Robotisé Pour Une Application D'Ébavurage", XP055674554, 2010, http://espace.etsmtl.ca/993/1/MAILHOT_David.pdf, 143 total pages.
Lafortune, D., "Robotisation De L'Ébavurage De Prëcision; Développement De Procédés Génériques Par Géométrie", XP055674541, 2011, http://espace.stsmtl.ca/901/1/LAFORTUNE_David.pdf, 150 total pages.
Chinese Office Action issued in Chinese PAtent Application No. 202080050599.3 dated Apr. 14, 2023, (w/ English Trnaslation).

* cited by examiner

METHOD FOR IMPROVED DEBURRING OF AN AERONAUTICAL PART

TECHNICAL FIELD

The invention relates to the field of turbomachines. More precisely, the invention relates to the machining of slots of aeronautical parts, and particularly to a method for deburring the edges of these slots.

PRIOR ART

Numerous aeronautical parts include edges, for example a compressor, turbine, or fan disk which comprises a plurality of grooves (slots) distributed over its outer circumference and receiving the blade roots. The bottom of each groove thus forms, with the upstream and downstream faces of the disk, a plurality of edges.

These edges generally include burrs which are the consequence of the creation of particular shapes (grooves, openings, cutouts, . . . ) in the part. The elimination of these burrs can be carried out, for example, by mechanical corner cutting.

Angle cutting can be defined as being a convex spoked shape comprised between a minimum radius m and a spoked chamfer C, as illustrated in FIG. 3. This radiating shape is a connection zone with a circular cross section between the two surfaces with is tangent at its ends to the two surfaces of the part.

Generally, there exist three major successive operations for performing corner cutting:

Deburring, which consists of removing the burr B,

Roughing, which consists of obtaining a chamfer C or a radius less than the minimum radius m (pre-spoking). This operation is often coupled with that of deburring, Finishing, which consists of obtaining radii R on either side of the chamfer C (trimming operation) or a radius M greater than the minimum radius m.

A precise definition of the corner cutting operations is obligatory for reasons of dimensioning and material integrity. In fact, the corner cutting operations in use are likely to generate incidents on rotating parts. More particularly, omitting the execution of these corner cutting operations or the incomplete elimination of burrs are a few of the principal causes of incidents linked to corner cutting operations. These omissions or these incomplete eliminations of burrs can be caused by manual adjusting operations. Thus, manual adjusting operations on edges considered critical, like those of the slots of fan disks for example, of turbine disks or drums, are currently replaced by automated corner cutting methods.

One of the methods uses brushing techniques for deburring, pre-spoking and finishing operations, by means of circular shank-flap brushes. Nevertheless, these techniques generate asymmetrical radii all along the edge of the slot, depending on the angle of inclination of the brush. More precisely, the maximum radius values are obtained by brushing perpendicular to the edge, i.e. by arranging the axis of rotation of the circular brush parallel to the edge. However, taking into account the structure of the aeronautical part, for example a turbine disk, brushing perpendicular to the edge at the bottom of the slot would cause an interaction between the brush and the part (at the ferrule for example), an interaction of this type being prohibited. Different brushing angles must therefore be used for brushing the edge at the bottom of the slots, generating asymmetrical shapes of the radii all along the edge of the slot. Moreover, in certain cases, the spoking of the edges at the bottom of the slots does not allow reaching the desired value of the radius.

In order to solve this problem, an edge preparation solely for a slot bottom is necessary. The means currently known (manual adjustment, milling on a machine tool) are not entirely satisfactory from an economic point of view, and taking into account the ranges currently used. Therefore, there exists a need for a more economically favorable deburring solution for aeronautical parts, while contributing the necessary accuracy in deburring certain critical portions of the slots of turbomachine disks.

DISCLOSURE OF THE INVENTION

The present disclosure relates to a method for deburring an aeronautical part by means of an articulated tooling comprising a plurality of axes of rotation, the aeronautical part comprising at least one edge to be deburred, the articulated tooling comprising a tool holder, the tool holder holding a calibration tool and a machining tool, the calibration tool and the machining tool being attached to the tool holder and being immovable relative to one another, the method comprising steps of:

calibrating the calibration tool and the machining tool, allowing determining the relative position of the calibration tool relative to the machining tool, parameterizing the aeronautical part allowing determining the position of the aeronautical part relative to the articulated tooling, by means of the calibration tool, deburring the at least one edge to be deburred by means of the machining tool moving along a predetermined trajectory, on the basis of the parameters obtained during the parameterization step.

The fact of arranging the calibration tool and the machining tool on the same tool holder, immovably relative to one another, allows improving the accuracy of the machining, of the deburring in this case, actually present in the specific case on the machine tool in which the transition from the calibration step to the deburring step would take place by replacing the calibration tool by the machining tool on the tool holder.

Thus, the fact of mounting the calibration tool and the machining tool fixedly on the same tool holder, and executing the calibration of the calibration tool and of the machining tool successively, allows defining exactly, and for the entire period of the deburring method, the relative distance between these two elements in space regardless of the position of the articulated tooling in the same space. More precisely, this step allows determining the relative positioning between the calibration tool and the machining tool, and not an absolute positioning in space. In fact, according to the prior art, a calibration of the calibration tool is generally not carried out, and the positioning of the machining tool is consequently obtained by means of the calibration tool in an absolute manner. However, the fact of carrying out coupled calibration on the calibration tool and on the machining tool, in particular by using the same calibration means, allows obtaining this relative positioning between these two tools. This configuration allows dispensing with positioning or trajectory errors of the articulated tooling which could be caused by the fact of exchanging the calibration tool for the machining tool, or conversely, and by the fact that the machining tool is generally arranged at one end of the articulated tooling comprising a plurality of axes of rotation, constituting an additional source of error. In the present case, the calibration tool and the machining tool being arranged immovably relative to one another on the same tool holder, and the relative position of one relative to the other being determined during the calibration step, the accuracy of the positioning or of the trajectory is thus improved.

In addition, the parameterization step can include the determination, by means of the calibration tool, of the position and of the inclination of a principal plane of the aeronautical part relative to the articulated tooling, of the position of a center of the aeronautical part, and of the angular position of the part around its central axis.

What is meant by "principal plane" is a plane along which the aeronautical part extends principally. When the aeronautical part is a disk, for example, the principal plane of the aeronautical part is the plane in which the diameter of the disk extends, the center of the aeronautical part is the center of the disk, and the central axis of the part is the central axis of the disk. What is meant by "angular position" is the position of an edge to be deburred around the central axis of the aeronautical part, in other words, the position of the aeronautical part around its central axis.

These parameters thus allow knowing, by means of the calibration tool, integral with the articulated tooling, the exact position of the aeronautical part relative to the articulated tooling, in the reference frame of the latter in other words, and not its absolute position in space. This allows improving the accuracy of the machining carried out by the machining tool, itself integral with the articulated tooling, the exact position of which relative to the calibration tool is known, in comparison with a specific case in which the position of the aeronautical part would be determined in an absolute manner. In particular, the exact position of at least one edge to be deburred relative to the articulated tooling, particularly the angular position of this edge, allows improving the accuracy of machining by the machining tool.

This method thus allows limiting the risk of neglecting the performance of corner cutting of certain edges, or the incomplete elimination of burrs. It also allows improving the accuracy of corner cutting operations of the edges of aeronautical parts.

In certain embodiments, the aeronautical part comprises a plurality of edges to be deburred uniformly distributed around a central axis of the aeronautical part.

In certain embodiments, the predetermined trajectory is a circular arc.

In certain embodiments, the calibration step is carried out by means of successive contacts between at least one calibration ball and the calibration and machining tool.

The calibration ball can be a ball attached immovably to a support, the dimensions of which are known. The calibration step can be carried out by an iterative method, by successive contacts between the calibration tool, for example, and the play ball at predefined points, until it converges to a stable value of the position of the calibration tool relative to the tool holder.

In certain embodiments, the at least one calibration ball is a first calibration ball attached to a support and immovable relative to this support, the calibration step being carried out by means of successive contacts between the first calibration ball and the calibration and machining tool, then by means of successive contacts between a second calibration ball and the calibration and machining tool, the second calibration ball being attached to the support, movable relative to this support.

The iterative method executed on the first calibration ball is also executed on the second, movable calibration ball. What is meant by "movably attached" is that the contact between the calibration tool and the second ball causes a movement of the latter. For example, the second calibration ball can be mounted on a flexible type head. This head bends slightly in contact with the calibration tool or with the machining tool. Conversely, the first calibration ball remains immovable in contact with the calibration tool. This allow further improvement in the accuracy of the calibration, in particular the accuracy of the relative position of the calibration tool relative to the machining tool.

In certain embodiments, the method comprises, between the parameterization step and the deburring step, a step of defining a first reference point on a first edge to be deburred by means of the calibration tool, and on the basis of the parameters determined at the parameterization step, said first reference point being the starting point of the predetermined trajectory during the deburring step.

Accurate knowledge, through the parameterization step, of the position of the aeronautical part, in particular of a first edge to be deburred, relative to the articulated tooling, allows accurately defining a reference point on said edge. Accurate determination of this reference point allows improving the accuracy of the deburring carried out by the machining tool during the deburring step.

In certain embodiments, after deburring the first edge to be deburred, a second reference point is determined on a second edge to be deburred by circumferential projection of the first reference point according to the parameters determined in the parameterization step, then the second edge to be deburred is deburred starting from the second reference point and along the predetermined trajectory.

The position and the orientation of the aeronautical part being known by the parameterization step, and the edges to be deburred being distributed uniformly around the aeronautical part, the position of the second reference point can be determined simply by circumferential projection of the first reference point on the second edge to be deburred.

In certain embodiments, the deburring and projection steps of reference points are repeated over at least a portion of the circumference of the aeronautical part.

The method for deburring the aeronautical part can be carried out automatically, by incrementally determining the exact position of the reference point, allowing accurate deburring of the edges to be deburred.

In certain embodiments, the articulated tooling is a robot with six axes of rotation, a single axis among the six axes being used during the deburring steps, the other axes being substantially fixed.

What is meant by a six-axis robot is an articulated arm comprising six articulations. Moreover, what is meant by "substantially fixed" is that the other axes are not strictly immovable, but carry out only slight adjusting movements and are therefore considered as fixed relative to the axis used for deburring. The fact of carrying out the deburring step by using only a single one of these six axes allows limiting the risk of cumulative errors linked to the movement of all the axes of the robot.

The predetermined trajectory of the machining tool is thus generated only by the rotation of a single axis of the robot, allowing obtaining a circular arc trajectory. This allows simplifying the method of deburring the edges, while limiting positioning and especially trajectory errors which would be generated by a work requiring large amplitude movement on two or more axes of the robot. In other words, the design of the tooling allows accomplishing the machining of the edges with very small movement amplitudes of the robot.

In certain embodiments, said single axis is oriented parallel to the central axis of the aeronautical part during the deburring step.

The fact of accomplishing deburring over a reduced travel of the axes of the robot, by aligning the rotation of the machining tool around said single axis of the robot with the axis of the part, allows further simplifying the method of deburring the edges, and further limiting the trajectory errors of the robot.

In certain embodiments, the machining tool is a milling tool with a hemispherical tip, and the calibration tool is a touch probe.

The hemispherical-tipped milling tool is particularly suited for deburring a metal edge.

In certain embodiments, the aeronautical part is a turbomachine disk, for example a turbine disk, and the edges to be deburred are the bottom edges of the slots of the disk.

What is meant by "bottom edges of the slots" is the portion of the slot of which the upstream and downstream edges form substantially a circular arc. The turbomachine disk can for example be a turbine disk, or a fan disk, but not solely.

This method thus allows accomplishing solely, first of all, the deburring of the edges of the bottom of the slots. In fact, in certain embodiments, the method can comprise, after the step of deburring the edges of the bottom of the slots, the deburring and/or the spoking of the edges of the other portions that the slots include. These portions can comprise in particular the entry V, the neck, the flank and the lobe of the slots. The fact of first deburring the edges of the bottom of the slots allows obtaining, at the end of the method of deburring the edges of the slots, desired values of the radii of the deburred corners, in particular that of the edges of the bottom of the slot.

BRIEF DESCRIPTION OF THE DRAWINGS

The invention and its advantages will be better understood upon reading the detailed description given below of different embodiments of the invention, given by way of non-limiting examples. This description refers to the appended pages of figures, in which.

DESCRIPTION OF THE EMBODIMENTS

Figure 1:
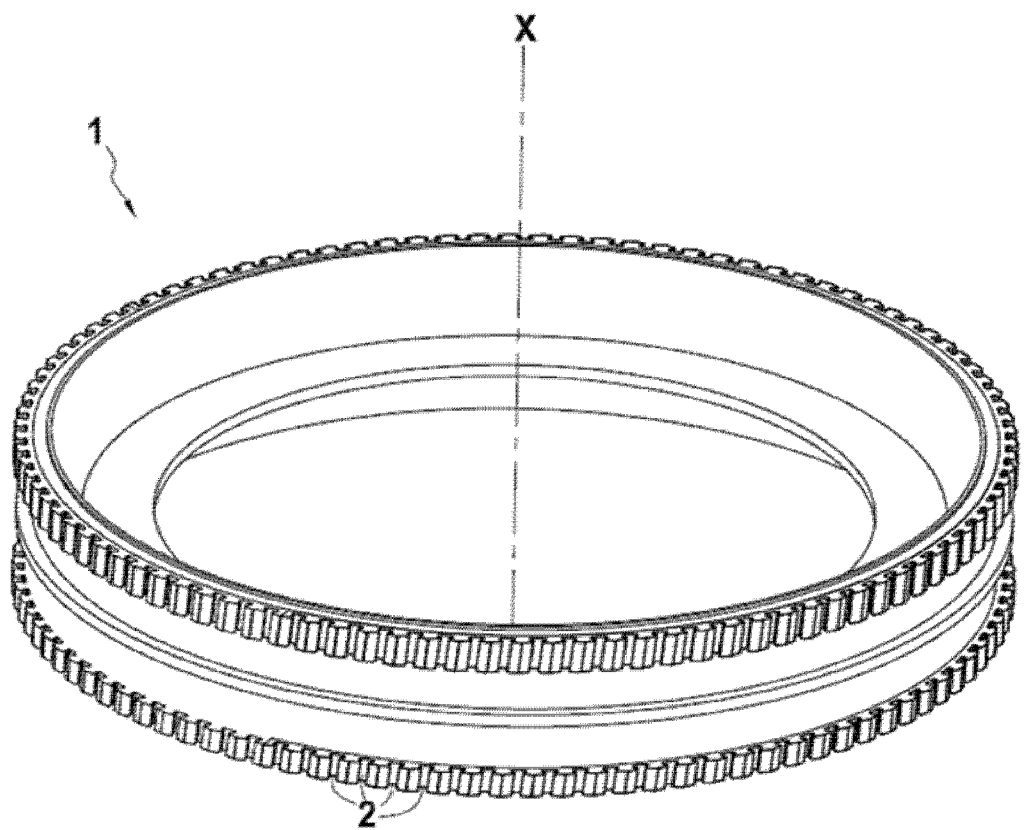
FIG. 1 shows a perspective view of a turbomachine disk.
Figure 2:
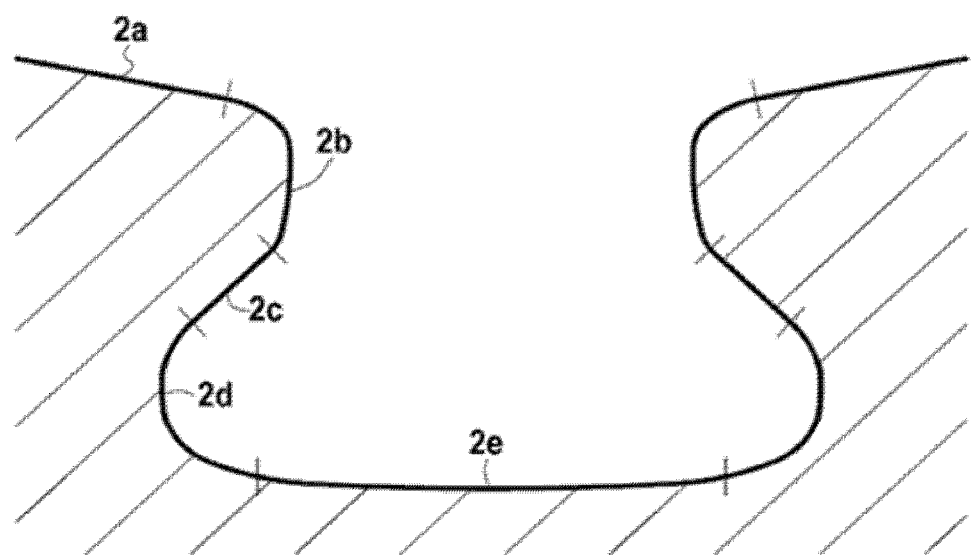
FIG. 2 shows a transverse section of a slot of the disk of FIG. 1.
Figure 3:
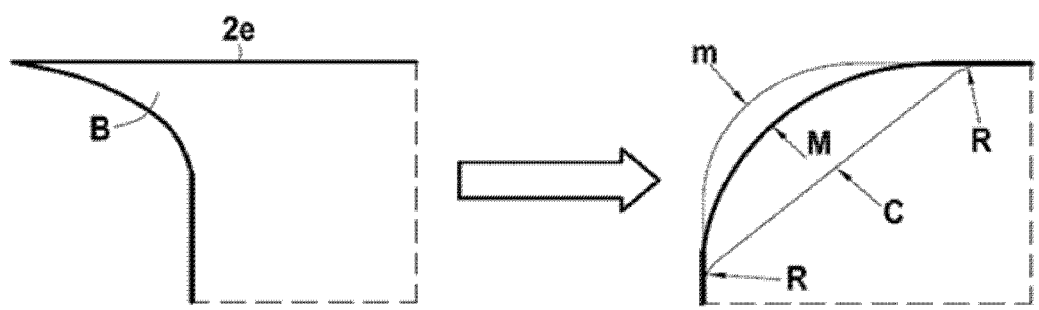
FIG. 3 shows a slot bottom edge before and after deburring, in a section in a plane perpendicular to the plane of FIG. 2.
Figure 4:
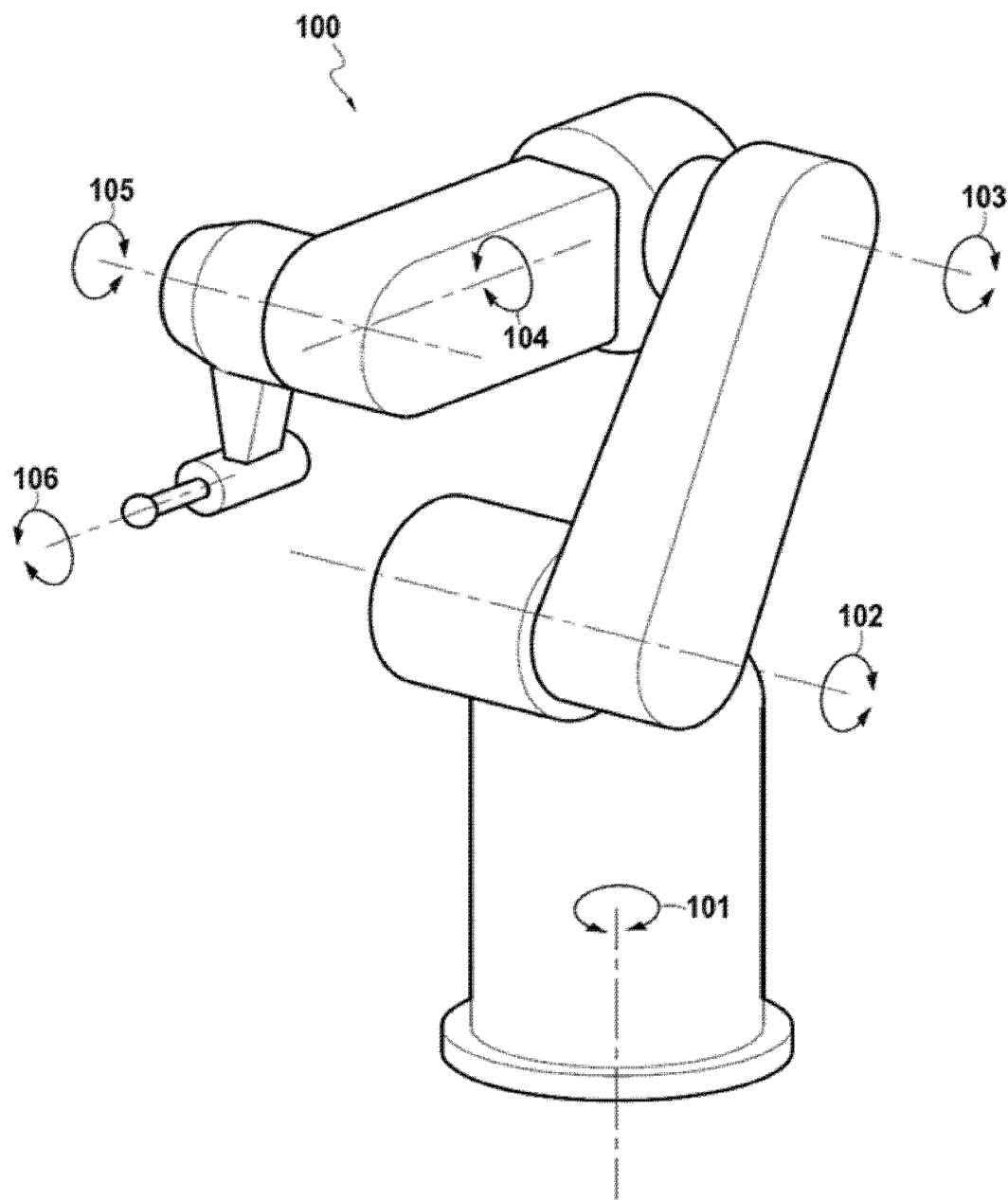
FIG. 4 shows a perspective view of an articulated tooling.

In the embodiment described below, the aeronautical part is an aeronautical turbine disk 1. FIG. 1 illustrates a turbine disk of this type comprising a plurality of slots 2 distributed uniformly around the disk. FIG. 2 illustrates the distribution of the different zones of a slot 2. The latter has successively a V-shape entry 2a, a neck 2b, a flank 2c, a lobe 2d and a bottom 2e. In the embodiment described below, the edge to be deburred is the slot bottom edge 2e. More precisely, the disk 1 comprises a plurality of slots 2, in other words a plurality of edges to be deburred, each slot comprising a bottom 2e of which the upstream end and the downstream end comprises an edge. FIG. 3 illustrates an edge of this type in a transverse section of the bottom 2e of the slot, before a corner cutting or deburring operation (left-hand illustration in FIG. 3) and after a corner cutting operation (right-hand illustration in FIG. 3), by means of a cutting or abrasive tool.

The method according to the present disclosure described below uses an articulated robot 100 with six axes 101, 102, 103, 104, 105 and 106. The articulated robot can be connected to a control unit (not shown), the control unit controlling individually each of the six axes of the robot. In order to dispense with the problem linked with cumulative errors by all of axes of the robot, the deburring work is carried out only on one axis, in particular the sixth axis 106 arranged at one end of the robot 100. In fact, the bottom of the slot 2e is formed only by a spoked shape. This radius can for example be 19 mm. hence a simple trajectory in one plane can allow the machining (or deburring) of the slot bottom edge 2e.

Figure 5A:
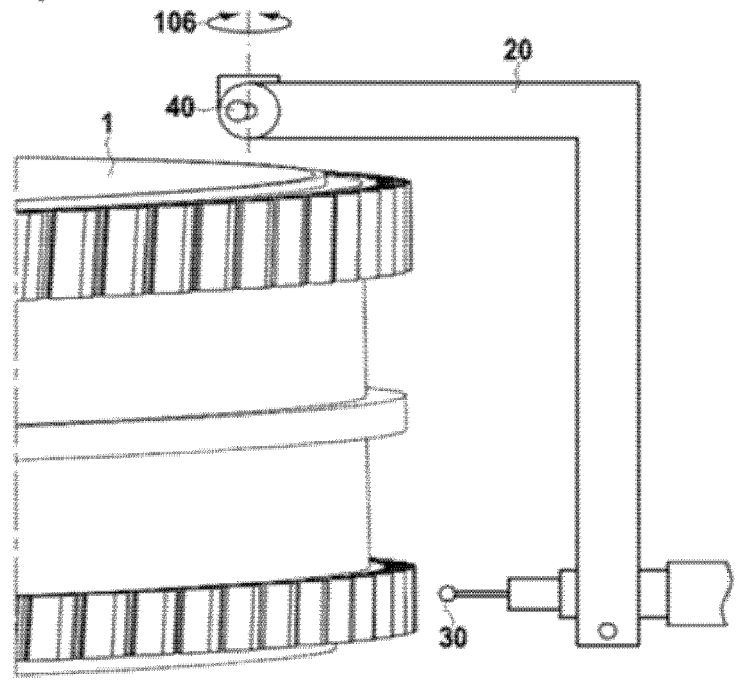
FIGS. 5A and 5B show partial perspective views of a step of deburring the disk of FIG. 1.
Figure 5B:
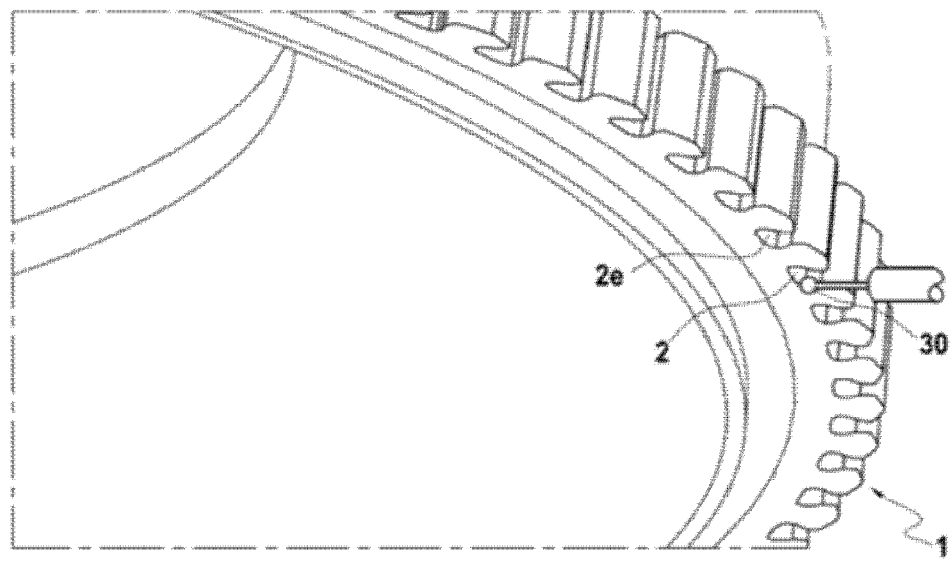
Figure 6:
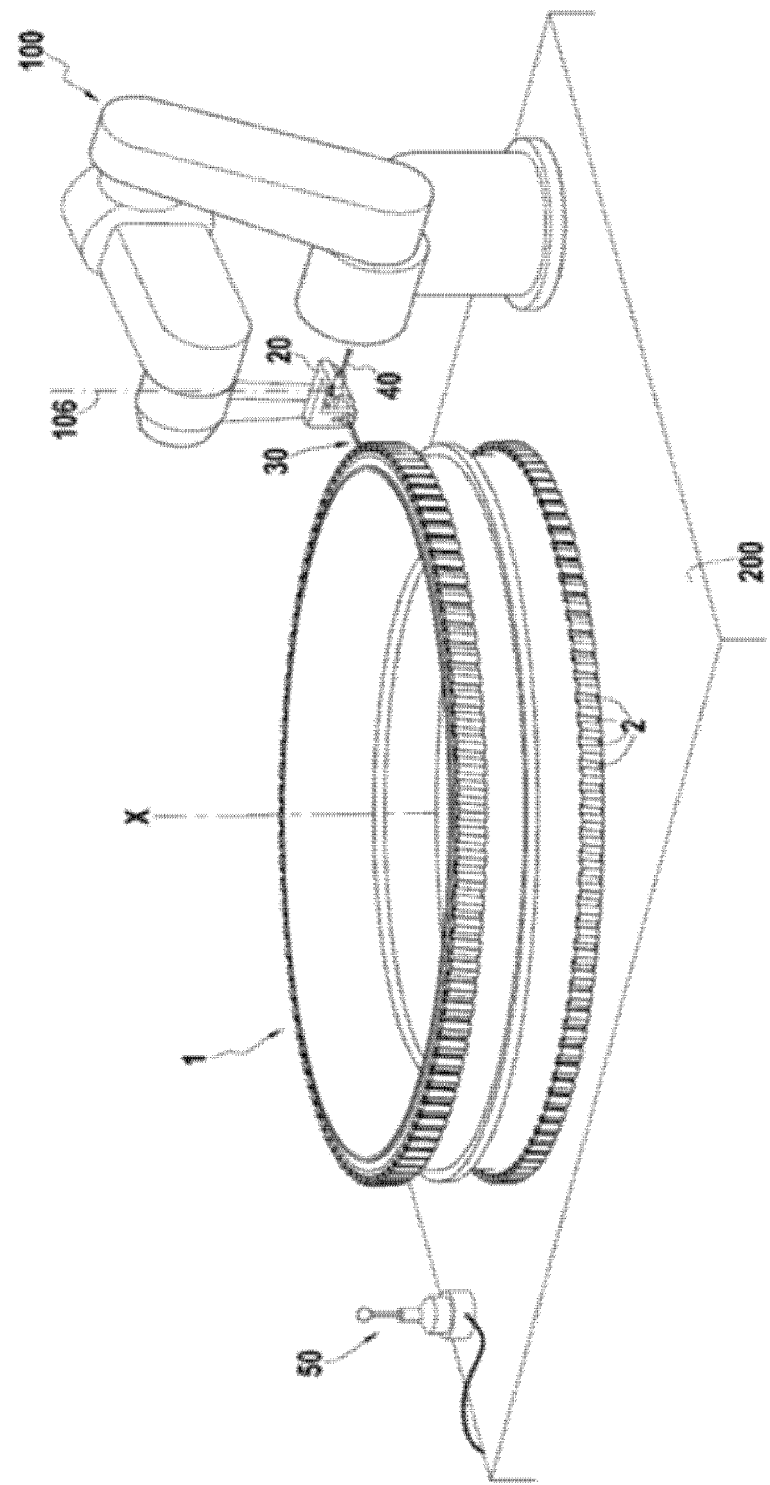
FIG. 6 shows an overall perspective view of the disk of FIG. 1, of the articulated tooling of FIG. 4, and of a calibration ball.
Figure 7:
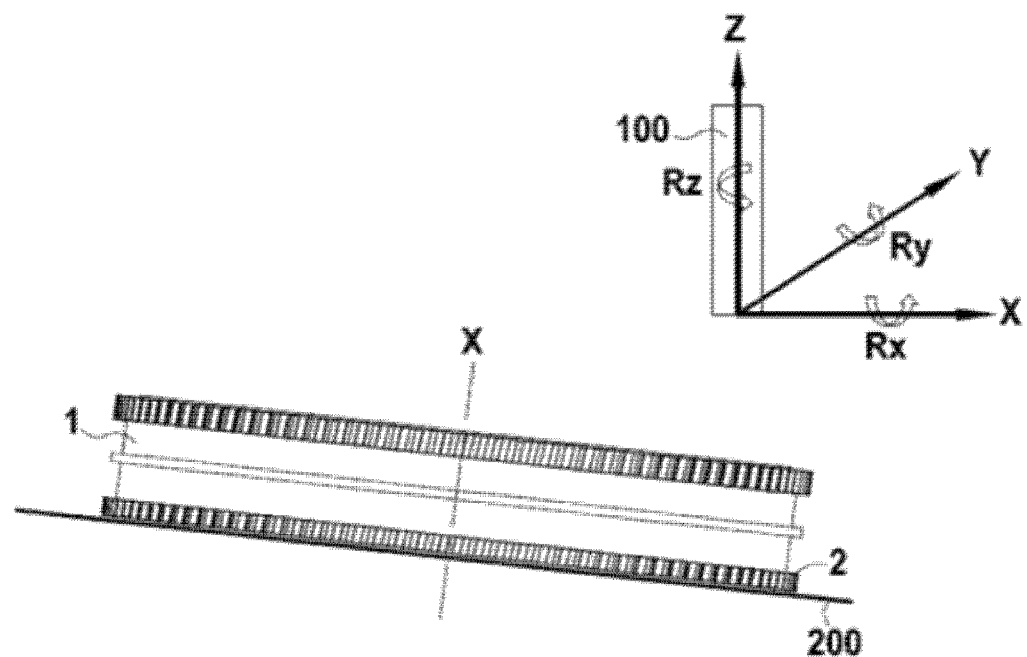
FIG. 7 shows a side view of the disk of FIG. 1, and its position in space relative to the articulated tooling.
Figure 8:
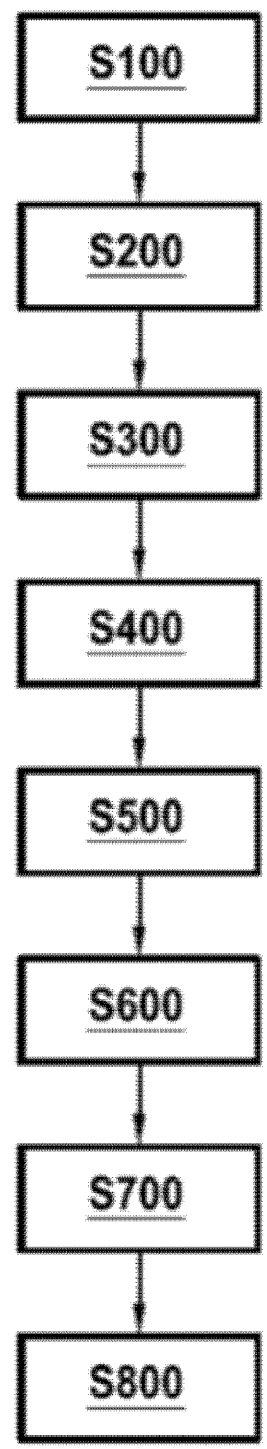
FIG. 8 shows schematically the steps of a method for deburring according to the present disclosure.
Figure 9:
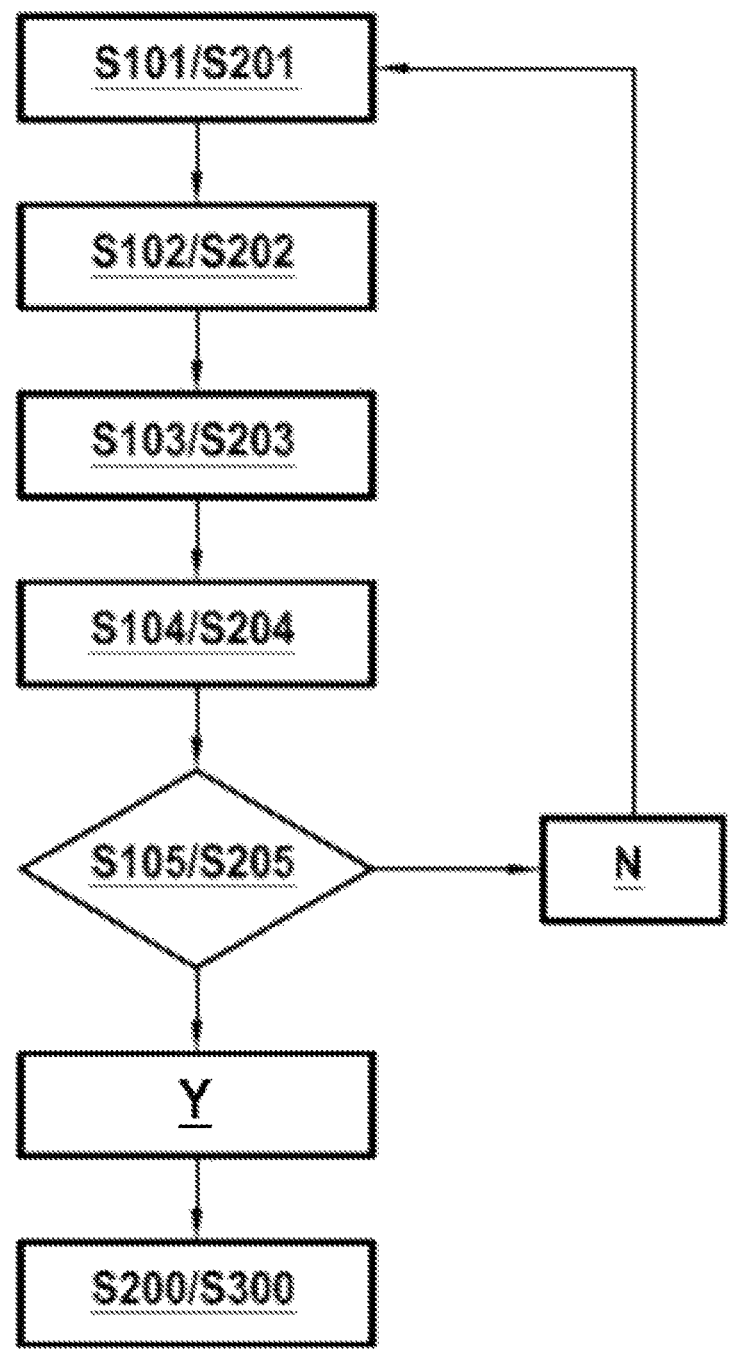
FIG. 9 shows schematically the detailed steps of the calibrations step of the deburring method of FIG. 8.
Figure 10:
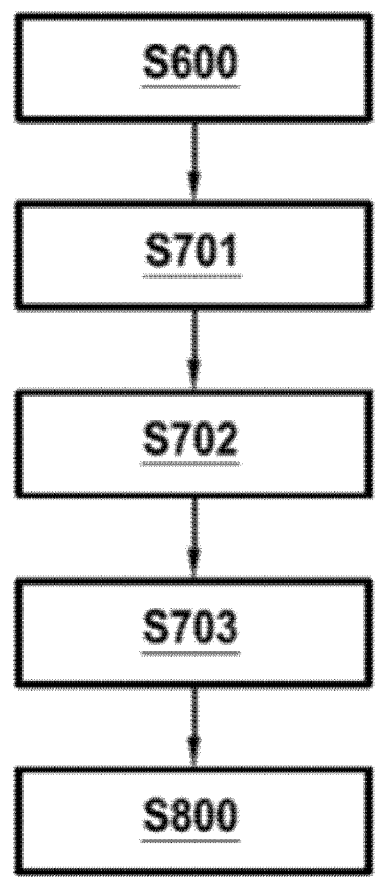
FIG. 10 shows schematically the detailed steps of the parameterization step of the deburring method of FIG. 8.

FIGS. 5A and 5B show a deburring operation of a slot bottom edge 2e by rotation of a tool around the axis 106.

A tool holder 20 is integral with the end of the robot 100, and movable in rotation around the axis 106. A machining tool 30 is attached to the tool holder 20 immovably relative to the tool holder 20. In this example, the machining tool 30 is a hemispherical tip milling tool, allowing obtaining a chamfer by using only the axis 106 of the robot 100.

A touch probe 40 is also attached to the tool holder 20 immovably relative to the tool holder 20. In other words, the machining tool 30 and the touch probe 40 are immovable relative to one another, regardless of the movements carried out by the robot 100. Moreover, the machining tool 30 and the touch probe 40 are arranged on the tool holder 20 so that the transition from a probing operation by the touch probe 40 to a deburring operation by the machining tool 30 can be carried out by rotation of the tool holder 20 by means of movements of the axes of the robot 100.

The machining tool 30 and the touch probe 40 are also connected to the control unit. The data detected by the touch probe 40, particularly during the calibration and parameterization steps described below, are transmitted to the control unit. The control unit thus controls the articulated tooling 100 and the machining tool 30 according to the parameters detected by the touch probe 40.

A method of this type for deburring slot bottom edges 2e will be described hereafter in the description, with reference to FIGS. 6 to 10.

The first phase of the method allows calibrating the touch probe 40 and the machining tool 30. In fact, before accomplishing the deburring, it is necessary to know the exact position of the part in space. It is therefore necessary to accurately calibrate in advance the touch probe 40 and the machining tool 30.

The first step (step S100) allows calibrating the touch probe 40. To this end, a fixed calibration ball 50 is used. The calibration ball 50 is for example attached to the support 200 to which the disk 1 is also attached. The calibration of the touch probe 40 on the calibration ball 50 can be carried out by different suitable methods. In this example, the calibration of the touch probe 40 is carried out according to an iterative method comprising the acquisition of three points in a plane passing through the center of the calibration ball 50, for example in orientations of 0°, 90° and 180° relative to the ball 50 (step S101) and a point on a plane offset from the first, ideally normal to the plane defined previously (step S102). Calculation allows determining the position of the center of the calibration ball 50 (step 103) and to deduce the gauge, i.e. the x, y and z coordinates of the center of the sphere at the end of the touch probe 40 relative to the attachment point of the robot (step S104). An iterative method allows converging and refining the result. The iterative procedure ends when the measurement gap obtained for each coordinate between two iterations is less than a predetermined threshold value, this threshold value depending on the application considered. According to this embodiment, this threshold value is 0.05 mm. The steps S101 to S104 are repeated as long as the determined value is greater than or equal to 0.05 mm ("N" in step 105). When the determined value is less than 0.05 mm ("Y" in step S105), the method continues to the next step.

A step complementary to step S100 can be carried out (step S200) and allows improving the accuracy of the calibration of the touch probe 40. This complementary step can be carried out or not depending on the application and on the accuracy expected of the system. It consists of accomplishing the same operations as those mentioned in step S100 with a second calibration ball (not shown) said to be movable (steps S201 to S205), which allows refining the calibration of the touch probe 40 obtained during step S100 with the fixed calibration ball 50.

Step S300 comprises operations similar to those carried out in steps S100 and S200, applied to the machining tool 30. At the end of this step, the gauge, i.e. the position of the center of the hemispherical ball at the end of the machining tool 30 relative to the attachment point of the robot, is known. The relative position of the machining tool 30 relative to the touch probe 40 can thus be deduced.

The following steps aim to determine the position of the disk 1 in space, relative to the robot 100. These steps allow a maximum reduction in localization errors and an increase in the accuracy of positioning. To this end, it is necessary to define the relative position of the disk 1 in space relative to the reference frame of the robot 100, more precisely relative to the reference frame of the tool holder 20, along the axis X, Y, Z, Rx, Ry and Rz.

Firstly, a plane on an upper face of the disk 1 is probed by the touch probe 40 in order to define the positioning of the part along the reference axes Z, Rx and Ry (step S400). The plane thus determined serves as the first reference plane, or principal plane, of the part.

After an offset of the touch probe 40 parallel to this first reference plane, three points are probed on the circumference of the disk 1, the touch probe 40 being oriented so as to extend parallel to the reference plane (step S500). This step allows defining the central axis A of the disk 1, and thus the positioning of the disk 1 along the reference axes Y and X. In other words, this step allows determining the position of the center of the disk 1 and its radius, according to the reference frame of the robot 100.

The following positioning step (step S600) of the disk 1 allows defining the angular position of the disk 1 along axis Rz. This angular position is defined relative to the slots 2. The touch probe 40 probes the plane surface adjacent to the slots 2, in other words the rim of the disk 1, in order to defined whether a slot 2 is present or not and to iterate this probing until it probes a bottom point 2e of a slot 2. This operation allows roughly defining the positioning of the disk 1 and of the slots 2 along the axis Rz.

The accurate positioning of the slots 2 and, more accurately, of the slot bottom 2e, is determined during the step S700. The accurate determination of the orientation of the disk 1 is carried out by the acquisition of a point on one upper face or one lower face of the rim at one end of the slot 2 (step S701). This probing allows creating a plane at the rim parallel to the reference plane defined in step S400.

The touch probe 40 then carries out the acquisition of two points belonging to the plane defined in step S701 and arranged on the active flanks 2c on either side of the axis of the slot 2 (step S702).

These two points allow deducing the center of the slot 2. This point is then measured by the touch probe 40 on the bottom of the slot 2e (step S703).

This new point corresponds to the reference point x0, y0, z0 from which the machining tool 30 accomplishes the machining or deburring of a bottom edge 2e of the slot along a predetermined trajectory (step S800). This deburring is thus carried out starting from this reference point, along the predetermined reference trajectory, by rotation of the tool holder 20 around the axis 106 of the robot 100.

Said predetermined reference trajectory accomplishes only the deburring of one slot bottom edge 2. To deburr the other slots 2, the reference point of this trajectory is projected circularly along the central axis A of the disk 1 determined in step S500 and on the basis of the parameters determined in steps S400 to S700.

Moreover, step S703 can be carried out on three slots. For example, if the disk includes thirty slots, step S703 is carried out on the first, the fifteenth and the thirtieth slot. These three points obtained are on a circle with center A' and radius R', calculated on the basis of these three points. This center and this radius are substantially different from the center A and the radius R found in steps S500 and S703, because they take into account the geometric errors of the robot. In this case, the geometric projection calculated relative to A' and R' will integrate the errors of the robot.

This method allows accomplishing these calculations and these positionings of the reference points, not relative to theoretical values, but relative to values detected by the robot.

Although the present invention has been described by referring to specific exemplary embodiments, it is obvious that modifications and changes can be carried out on these examples without departing from the general scope of the invention as defined in the claims. In particular, individual features of the different embodiments illustrated/mentioned can be combined into additional embodiments. Consequently, the description and the drawings must be considered in an illustrative, rather than a restrictive sense.

It is also clear that all the features described with reference to a method are transposable, alone or in combination, to a device, and conversely all the features described with reference to a device are transposable, alone or in combination, to a method.

The invention claimed is:

1. A method for deburring a turbomachine disk comprising a plurality of slots with an articulated tooling, the articulated tooling comprising a plurality of axes of rotation, the turbomachine disk comprising at least one edge to be deburred, the at least one edge to be deburred being a bottom edge of a slot of the plurality of slots of the disk, the articulated tooling comprising a tool holder, the tool holder holding a calibration tool and a machining tool, the calibration tool and the machining tool being attached to the tool holder and being immovable relative to one another, the method comprising steps of:

calibrating the calibration tool and the machining tool to determine the relative position of the calibration tool relative to the machining tool, parameterizing the turbomachine disk via the calibration tool, to determine the position of the turbomachine disk relative to the articulated tooling, deburring the at least one edge of the bottom of the slot to be deburred with the machining tool moving along a predetermined trajectory, on the basis of the parameters obtained during the parameterizing.

2. The method according to claim 1, wherein the at least one edge to be deburred comprises a plurality of edges to be deburred uniformly distributed around a central axis of the turbomachine disk.

3. The method according to claim 1, wherein the predetermined trajectory is a circular arc.

4. The method according to claim 1, wherein the calibration step is carried out via successive contacts between at least one calibration ball and the calibration tool, and between the at least one calibration ball and the machining tool.

5. The method according to claim 1, comprising, between the parameterizing and the deburring, a step of defining, via the calibration tool, a first reference point on a first edge of the at least one edge to be deburred, and on the basis of parameters determined at the parameterizing, said first reference point being a starting point of the predetermined trajectory during the deburring.

6. The method according to claim 5, wherein, after deburring the first edge to be deburred, a second reference point is determined, via circumferential projection of the first reference point, on a second edge of the at least one edge to be deburred, and wherein according too the parameters determined in the parameterizing, then the second edge to be deburred is deburred starting from the second reference point and along the predetermined trajectory.

7. The method of claim 6, wherein the deburring and projection steps of reference points are repeated over at least a portion of the circumference of the turbomachine disk.

8. The method according to claim 1, wherein the articulated tooling is a robot with six axes of rotation, and wherein a single axis among the six axes is used during the deburring, the other axes being substantially fixed.

9. The method according to claim 8, wherein said single axis is oriented parallel to a central axis of the turbomachine disk during the deburring.

10. The method according to claim 1, wherein the machining tool is a hemispherical tip milling tool, and the calibration tool is a touch probe.

* * * * *